Patented Sept. 9, 1952

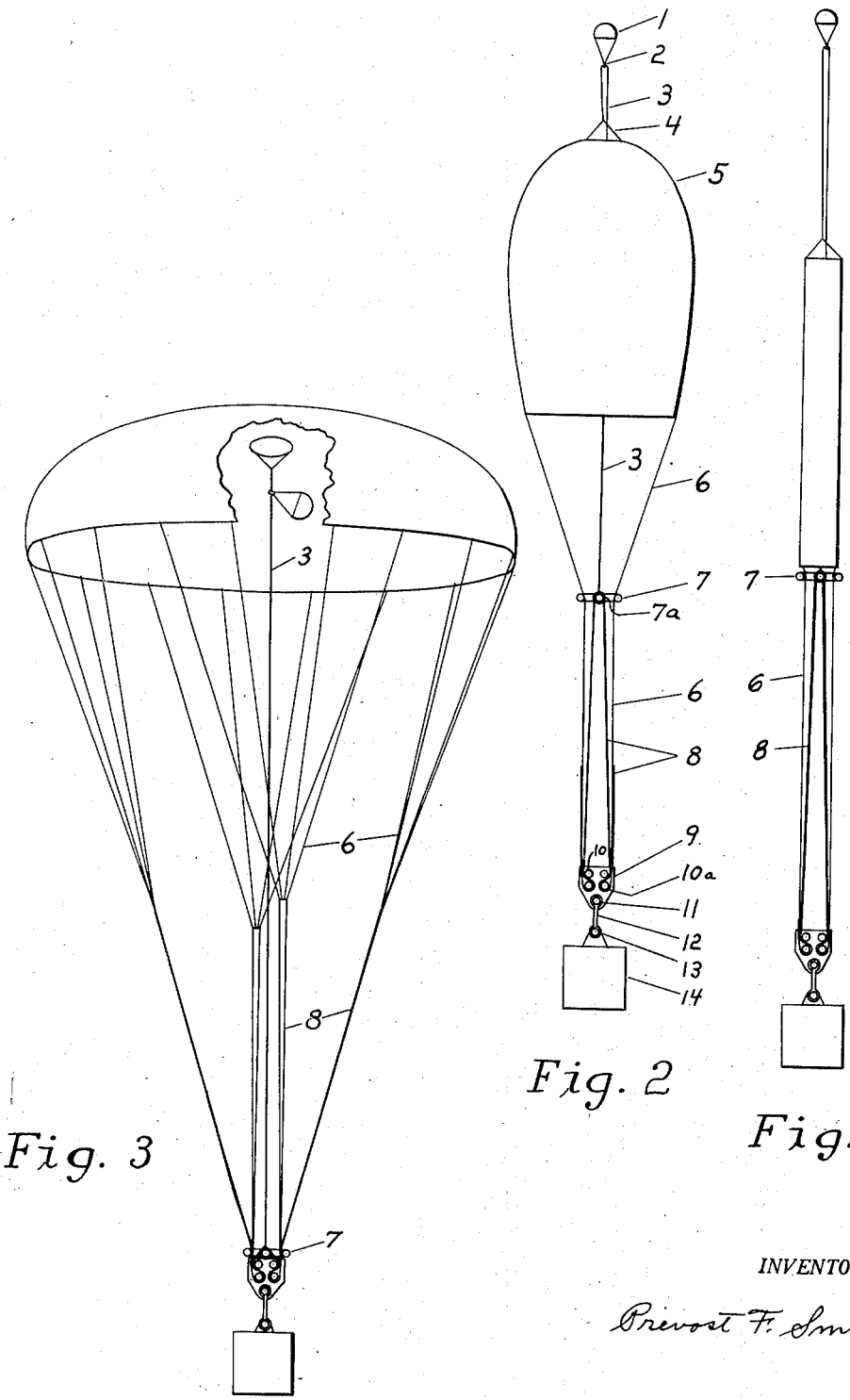

2,610,008

UNITED STATES PATENT OFFICE 2,610,008

PARACHUTE APPARATUS

Prevost F. Smith, San Diego, Calif.

Application March 7, 1949, Serial No. 80,039

11 Claims. (Cl. 244—152)

This invention relates to an improvement of my parachute disclosed in U. S. Patent No. 2,559,804 of July 7, 1951, and consists of a ring enclosing the suspension lines at the skirt, in the initial deployed position, which is then automatically and positively slid down the suspension lines as the velocity and thus the load on the parachute decreases thereby permitting the parachute to open.

More particularly, this addition to my previous parachute greatly increases the safe speed at which this parachute may be deployed.

Preliminary tests indicate that for personnel use the previous parachute had a safe shock load at speeds up to 500 miles per hour. Now with the addition of this ring, tests indicate that a far greater speed is feasible while detracting but slightly from the desirable quick opening characteristics at low speed.

One object of this invention is to reduce the initial air drag on the parachute to a minimum by holding the mouth of the parachute closed.

A second object is to maintain this minimum drag condition to a reasonable low speed.

A third object is to automatically remove the ring to permit the parachute to open as the speed decreases.

A fourth object is to insure a perfect deployment with the lines and canopy stretching the full length without interference between the two.

With these and other objects in view as will appear hereinafter, my invention consists of certain novel features of construction, combination and arrangement of parts and portions, as will be hereinafter described in detail and particularly set forth in the appended claims, reference being had to the accompanying drawings and other characters of reference thereon forming a part of this application in which:

Fig. 1 is a side elevation view as the parachute is initially deployed while Fig. 2 is a side elevation view of the parachute partly open and Fig. 3 is a view fully open.

Similar characters of reference refer to similar parts and portions throughout the several views of the parachute.

As shown in Fig. 1, the parachute canopy, 5, has suspension lines, 6, the upper ends of which are attached to the skirt of the canopy, 5, and the lower ends of which are attached to the suspension webs, 8. These webs are retained over cross bars or rollers, 10a, that are held in a cage, 9, which is attached to the load, 14, by pins, 11 and 13, and connecting strap, 12. This described arrangement is exactly as in my above mentioned patent application and operates as follows: When the initial speed is high, the drag of the canopy is high, and in pulling on the suspension lines, 6, exert a sufficient force to lock the rollers, 10a, against their locking means, 10. Thus the webs, 8, are momentarily prevented from moving around these rollers.

The ring, 7, has a cross bar, 7a, to which the free inside ends of the suspension webs, 8, are attached and the parachute is assembled so that the suspension lines are enclosed within the ring, respectively half on each side of the cross bar, 7a. Thus as packed and initially deployed, the skirt is kept closed by this ring and the drag at very high speeds is reduced to a minimum. As the parachute decelerates in this position, the drag decreases and the rollers are released to allow the free movement of the webs, 8. Since the principal drag is from the parachute, the canopy extends farther from the load while the ring, 7, being attached to the inside portions of the webs, moves toward the load, thereby permitting the parachute to fill with air and open.

It has been found desirable, for several reasons, to apply a drag parachute, 1, to this parachute. One method, as illustrated, is to pass the connecting web, 3, which is also described in the above patent application, thru a loop, 2, of the suspension lines of the drag parachute. This connecting web attaches on one end to the vent lines, 4, and passes thru the inside of the canopy and attaches to the cross bar, 7a, or the ring, 7. The length of this connecting web, 3, and the vent lines, 4, is such that when the parachute is first deployed, all lines, canopy and webs are stretched full length, yet when the parachute is fully open this connecting web pulls hard on the vent lines so as to increase the Cd (coefficient of drag) of the parachute. This method also prevents the ring, 7, from sliding down the suspension lines accidentally before it is pulled down by the suspension webs, 8. Further, the load of the drag chute is initially applied to the inner portions of the suspension webs so that if one of the suspension webs (four are illustrated) moves by the rollers 10a ahead of the other three, the full load of the drag chute is applied to that one suspension web, locking it while the other webs are permitted to adjust the alignment of the parachute while it is opening.

Thus the drag chute stretches the canopy full length preventing it from fluttering while exerting a balancing load on the inner side of the webbing, 8, to insure desired locking characteristics.

Further, this arrangement of the parachute apparatus causes a positive opening characteristic since pulling the vent down by the connecting web. 3, as in Fig. 3, eliminates the radial loading from the vent portion to the skirt of the canopy so that more of the inner air pressure is used to overcome the radial portion of the tension of the suspension lines. Thus the vent can be large enough to insure a stable parachute while the efficiency is appreciably improved to obtain a higher Cd.

Two more important results of this arrangement are the favorable deploying characteristics. Since in the parachute as packed and initially deployed, the suspension means is only one half length, the deployment acceleration forces are much less, and the differential of velocity between the load and the deploying parachute is somewhat less so that the strains on the fabric of the canopy are less. More particularly, this parachute is deployed a shorter distance than a conventional parachute, so the force of the air is not applied to this parachute for as long a period of time as to a conventional parachute, therefore the parachute does not decelerate to as low a speed during deployment as does a conventional parachute, resulting in a substantially lower force when the parachutes must again accelerate to their initial velocities.

Although I have here illustrated and described one embodiment of my invention, I do not wish to be limited to the details thereof, but desire to include in the scope of my invention the construction, combination and arrangement substantially as set forth in the appended claims.

Having thus described my invention, what I claim as new and desire to secure by Letters Patent is:

1. In a parachute apparatus of the class described, a parachute having a canopy, the combination of suspension lines each of which has one end attached to the skirt of the canopy of said parachute, a co-axial ring around said suspension lines, the other ends of said suspension lines attached to said co-axial ring, means adapted to support a load movably engaging said suspension lines, said co-axial ring adjacent the skirt of the canopy of said parachute when deployed maintaining said suspension lines folded to substantially half their full length, said coaxial ring adjacent said means when said parachute canopy is fully open, whereby initial shock load caused in deploying said parachute is substantially half in proportion to the shock load on the parachute when deployed with the suspension lines extended their full length.

2. In a parachute apparatus of the class described, the combination of a parachute having a canopy and suspension lines, a co-axial ring around said suspension lines, suspension webs each of which has one end attached to said suspension lines and the other end attached to said co-axial ring, means adapted to support a load movably engaging said suspension webs, said parachute to be packed and deployed with said co-axial ring adjacent the skirt of the canopy of said parachute when deployed maintaining said suspension lines folded to substantially half their full length, said coaxial ring adjacent said means when said parachute canopy is fully open, whereby initial shock load caused in deploying said parachute is substantially half in proportion to the shock load on the parachute when deployed with the suspension lines extended their full length.

3. In a parachute apparatus of the class described, the combination of a parachute having a canopy and suspension members, a co-axial ring around said suspension members, one end of said suspension members to be attached to the said parachute and the other end attached to said co-axial ring, means attached to the load to movably engage said suspension members the proportions being such that when the parachute is deployed said coaxial ring is positioned adjacent the skirt of said canopy and said suspension members are engaged with said means at substantially their middle portions.

4. In a parachute apparatus of the class described, a parachute having a canopy, the combination of suspension lines each of which has one end attached to the skirt of said canopy and means securing the other end to the vent of said canopy, a co-axial ring around said lines and attached to the portion of the said lines extending to the vent, means attached to the load to movably engage said suspension lines, the proportions being such that when the parachute is packed and deployed the said co-axial ring will be positioned at the skirt of said parachute and the suspension lines are engaged around said means at substantially their middle portions, the movement of said lines around said means to pull the said co-axial ring away from the skirt while the vent is being pulled down thereby permitting the parachute to fill with air and open.

5. In a parachute apparatus of the class described, a parachute canopy having a vent, the combination of suspension lines, vent lines, suspension webs each of which has one end attached to the said suspension lines and the other end attached to said vent lines, a co-axial ring around said suspension lines attached to said suspension webs, means attached to the load to movably engage said suspension webs, the proportions being such that when the parachute is packed and deployed, the said co-axial ring will be positioned at the skirt of said parachute and the suspension lines are engaged around said means at substantially their middle portions, the movement of said webs around said means to pull the said co-axial ring away from the skirt while the vent is being pulled down thereby permitting the parachute to fill with air and open.

6. In a parachute apparatus of the class described, the combination of a parachute having a canopy and a vent therein, suspension members each of which has one end attached to the skirt and means connecting the other end to the vent of said parachute, a co-axial ring around said suspension members and attached to the portion of the said suspension members extending to the vent, means adapted to be attached to the load to movably engage said suspension members, the proportions being such that when said parachute is deployed, said coaxial ring is positioned adjacent the skirt of said canopy and said suspension members are engaged with said means at substantially their middle portions.

7. In a parachute apparatus of the class described, the combination of a parachute having a canopy and a vent therein, suspension lines, suspension webs, vent lines, a connecting web, a co-axial ring around said suspension lines attached to said suspension webs and to the said connecting web, means attached to the load movably engaging said suspension webs, the proportions to be such that when the parachute is packed and deployed the said co-axial ring will be positioned at the skirt of said parachute and the suspension lines are engaged around said means at substantially their middle portions, the movement of said suspension webs around said means to pull the said co-axial ring away from the skirt while the vent is being pulled down thereby permitting the parachute to fill with air and open.

8. In a parachute apparatus of the class described, a parachute having a skirt, the combination of suspension lines each of which has one end attached to the skirt of said parachute and means connecting the other end to the vent of said parachute, a co-axial ring around said suspension lines attached to the portion of said lines extending to the vent, means adapted to carry a load movably engaging said suspension lines, a drag parachute movably engaging said first-mentioned means between said co-axial ring and the vent, the proportions being such that when the parachute is packed and deployed, the said co-axial ring is positioned at the skirt and the said drag parachute is open above the parachute and the suspension lines are engaged around said means at substantially their middle portions, the movement of said lines around said means arranged to pull the said co-axial ring away from the skirt to permit the parachute to fill with air and open.

9. In a parachute apparatus of the class described, a parachute canopy having a vent, the combination of suspension lines, vent lines, suspension webs each of which has one end attached to the said suspension lines and the other end attached to said vent lines, a co-axial ring around said suspension lines attached to said suspension webs, means adapted to carry a load movably engaging said suspension webs, a drag parachute movably connected to said vent lines, the proportions being such that when the parachute is packed and deployed, the said co-axial ring is positioned at the skirt and the said drag parachute is open above the parachute and the suspension lines are engaged around said means at substantially their middle portions, the movement of said suspension webs around said means to pull the said co-axial ring away from the skirt to permit the parachute to fill with air and open.

10. In a parachute apparatus of the class described, the combination of suspension lines, suspension webs, vent lines, a connecting web, a co-axial ring around said suspension lines attached to said suspension webs and to the said connecting web, means adapted to carry a load movably engaging said suspension webs, a drag parachute movably engaging the said connecting web, the proportions being such that when the parachute is packed and deployed the said co-axial ring is positioned at the skirt and the said drag parachute is open above the parachute and the suspension lines are engaged around said means at substantially their middle portions, the movement of said suspension webs around said means to pull the said co-axial ring away from the skirt to permit the parachute to fill with air and open.

11. In a parachute apparatus of the class described, the combination of suspension members each of which has one end attached to the skirt and means connecting the other end to the vent of said parachute, a co-axial ring around said suspension members and attached to the portion of said suspension members extending to the vent, a drag parachute movably engaging said first-mentioned means in the portion between said co-axial ring and the vent, means adapted to carry a load movably engaging said suspension members, the proportions being such that when the parachute is packed and deployed the said co-axial ring is positioned at the skirt and the said drag parachute is open above the parachute and the suspension lines are engaged around said means at substantially their middle portions, the movement of said suspension members around said means to pull the said co-axial ring away from the skirt to permit the parachute to fill with air and open.

PREVOST F. SMITH.

REFERENCES CITED

The following references are of record in the file of this patent:

UNITED STATES PATENTS

| Number | Name | Date |
|---|---|---|
| 1,266,508 | Ludtke | May 14, 1918 |
| 1,586,561 | Lucas | June 1, 1926 |
| 2,235,657 | Thornblad | Mar. 18, 1941 |
| 2,308,797 | Nasca | Jan. 19, 1943 |

FOREIGN PATENTS

| Number | Country | Date |
|---|---|---|
| 832,511 | France | July 4, 1928 |